United States Patent [19]

Chinloy et al.

[11] Patent Number: 5,271,844

[45] Date of Patent: Dec. 21, 1993

[54] PROCESSES FOR THE ALKALINE BIODEGRADATION OF ORGANIC IMPURITIES

[75] Inventors: David R. Chinloy, St. Catharine, Jamaica; Jean Doucet, Jonquiere, Canada; Michael A. McKenzie, Amherst, Mass.; Kwat I. The, Jonquiere, Canada

[73] Assignee: Alcan International Limited, Montreal, Canada

[21] Appl. No.: 944,045

[22] Filed: Sep. 11, 1992

[51] Int. Cl.$^5$ .............................................. C02F 3/34
[52] U.S. Cl. .................... 210/611; 210/908; 435/262.5
[58] Field of Search ............. 210/610, 611, 612, 614, 210/620, 621, 631, 908, 909, 619; 435/253.3, 262.5, 874

[56] References Cited

U.S. PATENT DOCUMENTS

| | | | |
|---|---|---|---|
| 4,440,644 | 4/1984 | Mudder et al. | 210/611 |
| 4,461,834 | 7/1984 | Mudder et al. | 435/253 |
| 4,492,756 | 1/1985 | Ghisalba et al. | 210/611 |
| 4,493,895 | 1/1985 | Colarutolo et al. | 210/611 |
| 4,510,057 | 4/1985 | Rowe et al. | 210/619 |
| 4,511,657 | 4/1985 | Colaruotolo et al. | 210/611 |
| 4,664,805 | 5/1987 | Focht | 210/611 |
| 5,169,532 | 12/1992 | Whitlock | 210/611 |

FOREIGN PATENT DOCUMENTS

| | | |
|---|---|---|
| WO9112207 | 8/1991 | European Pat. Off. |
| WO9200370 | 1/1992 | European Pat. Off. |
| 60-244286 | 4/1985 | Japan |

OTHER PUBLICATIONS van der Kooij, D. et al, "Substrate Utilization by an Oxalate-consuming Spirillum Species in Relation to its Growth in Ozonated Water":, Applied and Environmental Microbiology, Mar. 1984 pp. 551-559.

Smith, Richard L. et al, "Isolation of Anaerobic Oxalate-Degrading Bacteria from Freshwater Lake Sediments," Arch. Microbiol. (1985) 141:8≧13.

Smith, Richard L. et al, "Anaerobic Oxalate Degradation: Widespread Natural Occurrence in Aquatic Sediments," Applied and Environmental Microbiology, Jul. 1983 pp. 106-113.

Jayasuriya, G. C. N., "The Isolation and Characteristics of an Oxalate-Decomposing Organism," J. Gen. Microbiol., 12: 419-428.

Khambata, S. R. et al., "Studies on a New Oxalate-Decomposing Bacterium, *Pseudomonas Oxalaticus,*" St. Xavier's College, Bombay, India, pp. 505-597.

*Primary Examiner*—Thomas Wyse
*Attorney, Agent, or Firm*—Cooper & Dunham

[57] ABSTRACT

In a process for biodegrading under highly alkaline conditions organics in a waste stream derived from a Bayer processing system for producing aluminum oxides, i) the waste stream being typical of oxalate waste streams resulting from alkaline treatment of bauxite, the oxalate waste streams being rich in oxalates, formates, acetates, benzoates and sodium ions and having a pH in excess of 8, ii) treating the highly alkaline waste stream to neutralize and thereby lower pH and to reduce sodium ion concentration prior to introducing the waste stream into a bioreactor, iii) biodegrading the oxalates in the bioreactor by use of Pseudomonas genus microorganisms, and iv) discharging at least a portion of the biodegraded waste stream, the improvement being characterized by:

a) introducing the highly alkaline waste stream rich in sodium ions to the bioreactor to avoid the treatment of step ii), b) biodegrading the organics in the waste stream with the Pseudomonas genus microorganisms characterized by ATCC 53883 deposited microorganism and its derivatives which are functionally biologically equivalent to ATCC 53883, and c) wherein the biodegradation of organics, degrades in addition to the oxalates in the waste stream, the acetates, the formates and the benzoates to yield the biodegraded waste stream.

11 Claims, 1 Drawing Sheet

PROCESSES FOR THE ALKALINE BIODEGRADATION OF ORGANIC IMPURITIES

FIELD OF THE INVENTION

This invention relates to the biodegradation under highly alkaline conditions of organics in a waste stream which is rich in oxalates and is typically derived from a Bayer processing system for producing aluminum oxides from bauxite.

BACKGROUND OF THE INVENTION

A common problem in the processing of mineral ores, particularly in the processing of bauxite by the Bayer process, for the production of alumina is the generation and accumulation of oxalate ions commonly referred to as oxalates in the Bayer processing streams and waste streams. Environmental concerns may prevent the dumping of oxalates at disposal sites. In view of the appreciable quantities of oxalate solids which have to be removed from the Bayer process, which may range from one to ten tons daily in a typical medium-sized Bayer processing plant, the use of large scale disposal systems are required. For example, the solid oxalates with or without liming may be buried in red mud from the Bayer processing system. The oxalates could also be burned in a kiln, such as a lime kiln; however, these procedures are by and large prohibitively expensive.

As is generally understood, bauxites by and large contain low percentages, usually less than 0.5% of organic matter mostly in the form of humates. In the Bayer processing system, the humates, which dissolve in the process liquors, are ultimately degraded to acetates, formates, carbonates and oxalates. These compounds tend to concentrate as their sodium salts in the processing liquors. Most of these sodium salts have relatively high solubilities in the processing liquors and as such do not interfere with the process. However, sodium oxalates have a relatively low solubility and readily precipitate out of the processing liquors particularly in portions of the processing system which operate at cooler temperatures and higher caustic soda concentrations. As the oxalates precipitate out of the processing solution, restrictions in the processing system result which can considerably reduce the effectiveness of the overall processing operation. Furthermore, the build-up of oxalates in the processing liquors tends to cause a reduction in alumina trihydrate yield from the process and ultimately a co-precipitation of the sodium oxalate with the alumina trihydrate. When the alumina trihydrate is contaminated with oxalates, it has been found that calcination of the precipitate results in a very weak and fine alumina which leads to excessive dust losses in the subsequent calcination step and production of aluminum by electrolysis. Hence it is very important to keep the concentration of oxalate levels in the Bayer processing system below some critical value to avoid these problems. Although it is possible and is routinely done in many areas to remove oxalates from the processing system by drawing off a portion of the liquors, or by precipitating out and removing solid sodium oxalate, the above noted alternatives in the ultimate disposal of the oxalates are becoming commercially prohibitive.

Australian patent application 39465/89 (common assignee) discloses a process for the microbial degradation of oxalate ions in a stream discharge from the Bayer processing system. The microbial degradation provides an effective economically attractive approach to the removal of oxalates from a waste stream of Bayer processes. The process can be operated on either a continuous or batch basis. It was thought necessary however to adjust the pH of the oxalate containing waste stream and to reduce sodium ion concentration in the waste stream to levels which would be compatible with the microorganisms of the bioreactor. The preferred microorganisms are of the Pseudomonas genus.

As described in international publication WO92/00370 (common assignee), a particularly preferred oxalate degrading bacterial species is variant B-1 belonging to the genus Pseudomonas and having the characteristics of deposit ATCC 53883. The microorganism, in addition to its deposited information can also be characterized as being isolated from rhizosphere soil surrounding a Rhubarb plant or a Dieffenbachia plant and having the following taxonomic data:

| | | |
|---|---|---|
| i) Gram negative | | + |
| Aerobic metabolism | | + |
| Polar flagella | | + |
| Motility | | + |
| Oxidase | | weak and slow |
| Catalase | | + |
| ii) resembles *Xylophilis ampelina* | | |
| iii) differs from *Xylophilis ampelina* in the following distinct characteristics: | | |
| | *X. ampelina* | B-1 |
| Utilization oxalate as sole carbon source | − | + |
| Acid from O-F arabinose | + | − |
| Urease | + | − |
| Growth Factor Requirements | + | − |

It was preferred that the biodegradation process using this microorganism be carried out at pH close to neutral and that the sodium ion concentration in the incoming stream did not exceed 8,000 mg/L. Furthermore, it was preferred that expensive nutrients be constantly added to the media of the bioreactor. Such nutrients included magnesium sulfate, iron sulfate and yeast extract. Such preferred processing techniques with the microorganism of deposit ATCC 53883 substantially added to the operating costs for degrading oxalates, although such steps had always been thought necessary to ensure long term continuous viability of the microorganisms in the bioreactor.

Other attempts have been made in the microbial biodegradation of oxalates in waste streams from Bayer processing systems. International publication WO91/12207 discloses the microbial degradation of oxalates in the waste stream by use of alkalophilic oxalate-degrading aerobic microorganisms. Such microorganisms are of the Bacillus species and which were derived from the alkaline waters of Bayer plant cooling ponds or mud disposal ponds. Although the process of this published application is effective in biodegradation of oxalates at a pH in the range of 8 to 12, there are however significant drawbacks to the process in that acetates and benzoates and other organic materials in the oxalate rich waste stream do not appear to be degraded and furthermore, the residence time for treatment of the oxalate rich streams is in the range of 50 hours or more. This lengthy residence is necessary in order to achieve 100% degradation of the oxalates in the waste stream.

According to this invention, an improvement in the biodegration of oxalates derived from a Bayer processing system is provided. The improvement relates to the degradation of the organics which include the oxalates, acetates, benzoates and formates in the incoming waste stream at high pH in the range of 8 to 12 and also at high levels of sodium ion concentration common to those found in the oxalate containing streams. Such degradation is carried out with the Pseudomonas species of microorganisms having characteristics of ATCC 53883 and its derivatives which are functionally, biologically equivalent to the deposited material. By use of these microorganisms at the high pH, at the high sodium ion concentration and at ambient temperature, residence times for the treated stream is considerably reduced by at least 10 fold compared to prior art processes.

SUMMARY OF THE INVENTION

The advantages and features of the improvement of this invention are provided in accordance with the following. In a process for biodegrading under highly alkaline conditions organics in a waste stream derived from a Bayer processing system for producing aluminum oxides,
i) the waste stream being typical of oxalate waste streams resulting from alkaline treatment of bauxite, the oxalate waste streams being rich in oxalates, acetates, benzoates and sodium ions and having a pH in excess of 8,
ii) treating the highly alkaline waste stream to neutralize and thereby lower pH and to reduce sodium ion concentration prior to introducing the waste stream into a bioreactor,
iii) biodegrading the oxalates in the bioreactor by use of Pseudomonas genus microorganisms, and
iv) discharging at least a portion of the biodegraded waste stream, the improvement being characterized by:
a) introducing the highly alkaline waste stream rich in sodium ions to the bioreactor to avoid the treatment of step ii),
b) biodegrading the organics in the waste stream with the Pseudomonas genus microorganisms characterized by ATCC 53883 deposited microorganism and its derivatives which are functionally biologically equivalent to ATCC 53883, and
c) wherein the biodegradation of such organics degrades in addition to the oxalates, the formates, the acetates and the benzoates to yield the biodegraded waste stream.

BRIEF DESCRIPTION OF THE DRAWINGS

A preferred system in of this invention is carried out as shown in FIG. 1 which schematically represents the flow diagram for the processing system.

DETAILED DESCRIPTIONS OF THE PREFERRED EMBODIMENTS

Figure 1:
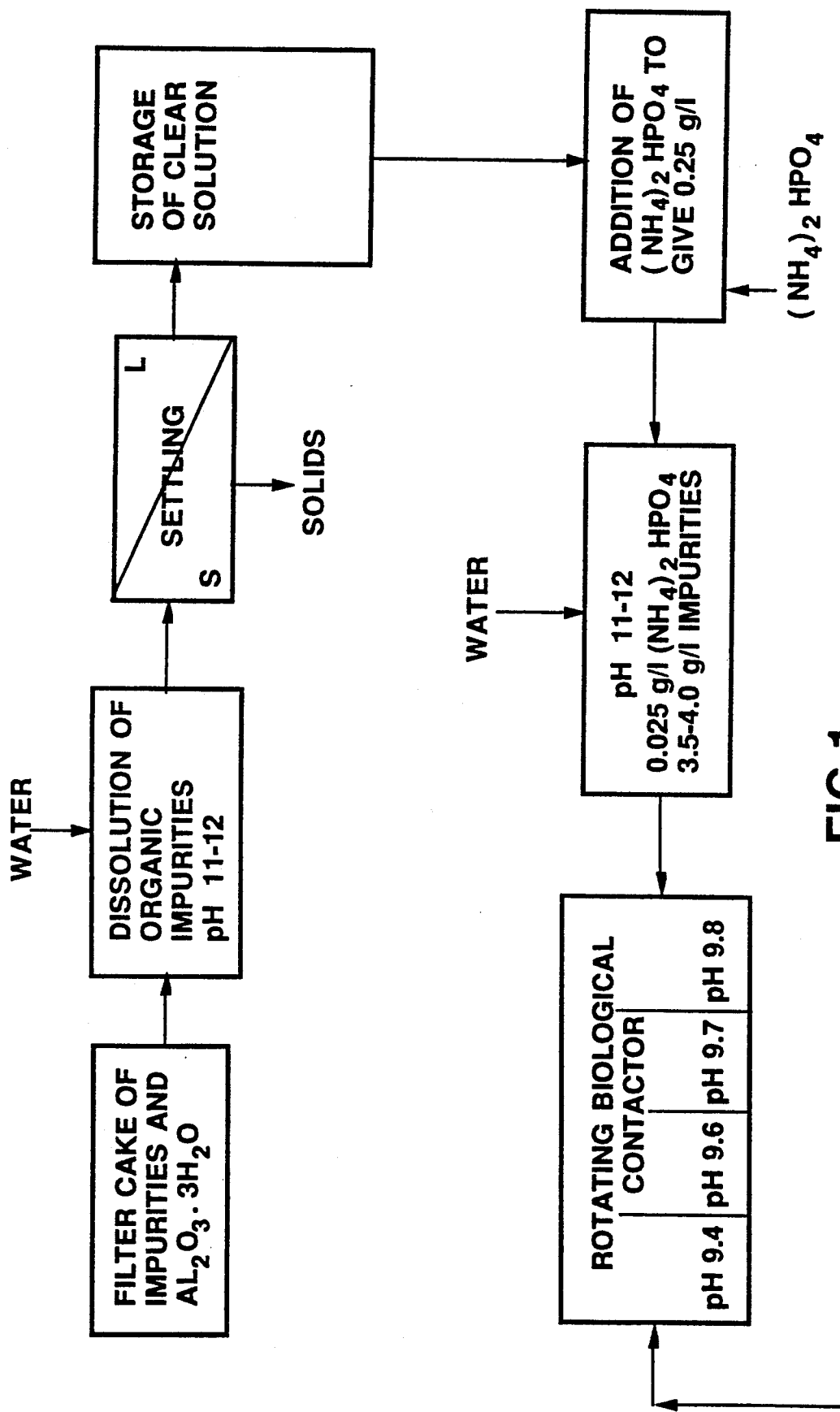

Oxalates in industrial wastes are presenting an increasing problem from the standpoint of disposal into the environment. As already noted, there are energy intensive processes for ridding industrial waste of oxalates. The processes involve the calcination of the industrial waste; that is burning of waste at a temperature in the range of 800° C. to yield an $Na_2CO_3$ or calcination at a temperature in the range of 500° C. after reaction of the industrial waste with lime to yield $CaCO_3$. Both of these calcination processes are energy intensive and require a special type of kiln capable of handling fine solids. Although there is a variety of industrial wastes which include oxalates, as described above, one important source of oxalates is derived from the Bayer process which relates to the processing of bauxite for the production of alumina. Further details of the Bayer process and its resultant production of industrial waste including oxalates is disclosed in applicant's Australian application 39465/89.

The microorganism used in this invention, which is particularly suited to degrading oxalates in a variety of industrial wastes to provide thereby an oxalate-reduced or oxalate-free waste stream was discovered from soils surrounding oxalate producing plants. The isolated microorganism was stressed in an oxalate rich media and then subjected to a purification process. The microorganism, under appropriate conditions degrades oxalates in various types of wastes by the oxalate providing a carbon source for the metabolism of the microorganism. As the microorganism metabolizes the oxalates, the oxalates are transformed into biomass and possible carbon dioxide. It is thought that this microorganism exists in soils surrounding any form of oxalate producing plant, such as *Dieffenbachia picta* (Dieffenbachia), *Jatropha padogrica; Monstera ssp: Philodendron spp; Rheum rhaponticum* (Rhubarb). Preferably the microorganism of this invention is isolated from soils surrounding the Rhubarb or Dieffenbachia plant. Particular details of the manner in which the microorganism of this invention was isolated from ground surrounding Rhubarb and Dieffenbachia plants is set out in the following Examples.

By way of detailed taxonomical characterization, it was found that the microorganism is of the Pseudomonas genus and is not similar to any known species of Pseudomonas. The species of Pseudomonas has therefore been identified as species B-1. The microorganism is on deposit at ATCC under No. 53883, deposited Mar. 27, 1989 in accordance with the requirements of the Budapest Treaty.

It is appreciated that in a variety of oxalate rich effluents, the subject microorganism of ATCC 53883 may be employed. It is appreciated by those skilled in the art that such other forms of oxalate containing effluents may require pre-treatment to avoid any other types of contaminants killing off the microorganisms. It is appreciated that, in accordance with standard culture techniques, the oxalate containing sample to be treated may be cultured on an experimental basis in the newly considered effluent to determine its growth characteristics in that particular effluent. Such oxalate waste streams may be derived from the processes of tanning of leather, the extraction of niobium by froth flotation, contaminated product produced during the manufacture of oxalic acids and, as already noted, oxalic waste stream from the Bayer processing system.

The procedure for isolation and identification of Pseudomonas B-1 ATCC 52883 is fully explained in WO92/00370. The following is offered as a brief explanation of the procedure for isolation. The bacteria can be isolated from oxalate rich rhizosphere soil of two different types of plants, in particular, Rhubarb and Dieffenbachia. The soil from each plant root zone can be added to a sterile flask containing Oxa-1 medium adjusted to neutral pH with sodium hydroxide. The flask can be incubated for an extended period of time at around 28° C. After several passages with the culture the mixed culture of bacteria can then be grown in an oxalic acid medium. Preferably a rotating biological contactor can be used to culture the mixture of bacteria in the oxalic acid medium. Culture can then be removed from the rotating biocontactor and inoculated onto nutrient agar and incubated on oxalate plates. After the necessary incubation period, colonies of the bacteria develop which have the characteristic morphology and colour of Pseudomonas B-1.

The improvement, according to this invention which distinguishes from the biodegradation process of published Australian application 39465/89 can be characterized as follows:

1) Without any pretreatment the highly alkaline waste stream rich in sodium ions and oxalates may be introduced directly to the bioreactor. This avoids the usual pre-treatment involving neutralization and reduction in sodium ion concentration.

2) The preferred microorganism in the bioreactor is that having the characteristics of Pseudomonas B-1 ATCC 53883. It is understood that derivatives of this microorganism may also be used in accordance with this invention where such derivatives are functionally, biologically equivalent to the microorganism of ATCC 53883. By functionally, biologically equivalent it is meant that the derivative of the Pseudomonas B-1 may not have all of the identical characterizing features of ATCC 53883 but that its function in a biocontactor is the same as ATCC 53883 in being able to biodegrade the organics in the oxalate waste stream which is highly alkaline and furthermore, is processed at a high pH in the biocontactor.

3) The Pseudomonas B-1 also has the additional desired characteristic of not only being able to degrade oxalates in the waste stream but as well formates, acetates and benzoates to yield a biodegraded waste stream which normally is free of organics.

4) It has been found that the additional costly nutrients as required and disclosed in applicant's published Australian application 39465/89 are not required. The only nutrients added to the waste stream before introduction to the rotary biocontactor or which is introduced directly to the rotary biocontactor are the normal sources of nitrogen and phosphorous. No additional minerals, yeast extracts or the like are required as special nutrients in operating the biocontactor at high pH.

5) The efficiency of the microorganisms at this high pH in degrading organics is such that a residence time in the range of 3 to 5 hours within the biocontactor can achieve a reduction in organics to less than 25% by weight of the starting concentrations of the organics. It is appreciated that the concentration of organics in the reactor effluent can vary considerably due to variations in starting concentrations of organics. Hence, longer residence times of greater than 12 hrs and up to 24 hrs may be required to achieve complete degradation of all organics in the incoming waste stream. This significant decrease in residence time can increase the throughput of the waste streams to be treated compared to prior art systems which require residence times normally in the excess of 50 hours.

6) In treating the waste streams at high pH the carbon dioxide evolved by the metabolism of the microorganisms is converted into sodium salts of carbonates and bicarbonates. Such carbonates provide a buffering action and thereby minimize the impact of waste streams entering the system at low pH. For example, oxalate streams for whatever reason having a lower pH, for example, in the range of 2, may be introduced to the reactor for at least 8 hours and not harm the microorganisms so that the waste stream returning to the alkaline pH resumes normal function of the microorganism.

7) The oxalate containing waste stream normally has a pH higher than 8 and is usually within the range of 8 to 12. The oxalate containing waste streams, as derived from the Bayer processing system normally has a pH in the range of 11 to 12 and contain excessive amounts of sodium salts of the organic purities normally in the range of 4 g/L. The sodium salts of the organics normally found in the oxalate waste stream include formates, acetates and benzoates.

Preferred embodiments of the invention are demonstrated in the following examples.

EXAMPLE 1

The nutrient media of pH 11.0 has the composition as described below. This nutrient media is used to prepare the initial inoculum of the microorganism, and in the serial dilutions described in Example 2. It is made by dissolving in water the appropriate amounts of the solids.

| | |
|---|---|
| Sodium Oxalate | 7 g/L |
| Ammonium Monohydrogen Phosphate | 0.5 g/L |
| Yeast Extract | 0.1 g/L |
| Magnesium Sulphate | 0.1 g/L |
| Ferrous Sulphate | 0.05 g/L | pH of the media is adjusted to 11.0 by the addition of 1M NAOH solution.

EXAMPLE 2

The rotating biological contactor is initially charged with the active microorganism ATCC 53883 in the nutrient media at pH 11 by a conventional serial dilution procedure. The details of the serial dilution are described below.

One tablet of the freeze-dried microorganism characterized at ATCC 53833 is placed in 100 mL of the nutrient media prepared according to Example 1, held in a 250 mL Erlenmeyer flask.

The flask and contents are placed in an orbital shaker, operating at 170 RPM, and held at a temperature of 28°-30° C. for a period of 18-24 hours. The resulting solution is the "inoculum".

A 5 mL portion of inoculum is placed in 200 mL (two portions of 100 mL each) of nutrient media, and held, as described above, at 28°-30° C. with shaking, for 18-24 hours.

The 200 mL of inoculum is then diluted to 500 mL (5 portions of 100 mL each) with nutrient media and held at 28°-30° C. with shaking for 18-24 hours.

The 500 mL of inoculum is then diluted to 1500 mL (15 portions of 100 mL each) with nutrient media and held at 28°-30° C. for 18-24 hours.

The 1500 mL of inoculum is then transferred to a stainless steel beaker of 8.0 L capacity, and diluted to 7.5 L with nutrient media, and held at 30° C. Air is bubbled through the solution to provide good agitation and a supply of air to the microorganisms. The solution is held for 18-24 hours.

The resulting 7.5 L of inoculum is placed in the 300 L capacity distribution tank of the industrial scale biodegradation equipment. The tank is filled with 150 L of the solution of dissolved impurities. This solution is at pH 11-12, contains 0.025 g/L of ammonium phosphate and around 4 g/L of dissolved sodium salts of the organic impurities. Additional nutrient media is then added to give a total volume of 300 L. This solution is held for 18-24 hours. Then 30 g of yeast extract are added to the solution.

Next 75 L of this solution is placed in each of the four compartments of a rotary biodegradation contactor. To each compartment is next added 150 L of the solution of sodium salts of the organic impurities prepared according to the procedure described in Example 3.

The contents of each compartment are then left for 24 hours, with rotation of the discs, to permit the microorganism population to develop.

At the end of this time, the continuous flow is begun of the solution of dissolved sodium salts of the organic impurities containing 0.025 g/L of ammonium phosphate. It is not necessary to add regularly additional nutrient, other than the phosphate, to the incoming material.

EXAMPLE 3

An example of the commercial scale process is carried out at a Bayer Process plant in Jamaica, W.I., treating Jamaican bauxite.

The organic impurities are removed from the spent liquor by evaporating the liquor to a high concentration of caustic, cooling to ambient temperature, to produce a supersaturation concentration of impurities in the liquor, and allowing the impurities to precipitate after the addition of fine particles of seed, and filtering off the organic impurities. The filtration gives a filter cake comprising the sodium salts of the organic impurities, aluminum oxide trihydrate solids which have precipitated concomitantly with the organic impurities, and some occluded highly alkaline Bayer Process liquor.

In the process of this invention, shown in FIG. 1, the moist filter cake is dissolved in water, in this instance condensate from another section of the Bayer Process, to give a solution containing about 4 g/L of dissolved organic impurities. Because of the entrained Bayer liquor in the filter cake, the pH of this solution is high, between 11 and 12, and may be higher. It is possible that a slurry may be produced on such dissolution due to the coprecipitation of aluminum oxide trihydrate.

Optionally, the slurry is then passed to a settling stage, where the alumina oxide trihydrate settles out. The clear supernatant liquor, still containing about 4 g/L of the sodium salts of the organic impurities at a pH of 11-12 or higher is sent to a storage vessel.

Next, the sufficient ammonium monohydrogen phosphate is added to the solution of organic impurities to give a concentration of 0.25 g/L $(NH_4)_2HPO_4$.

Agricultural ammonium phosphate fertilizer is conveniently used.

The dissolution of the filter cake, settling, and addition of ammonium phosphate can be done in either a continuous or batch mode.

The solution containing the phosphate is then allowed to continuously flow into a dilution vessel, where additional water is added to provide a 10-fold dilution. The diluted solution typically has a pH of between 11 and 12, and contains about 0.025g/L of ammonium monohydrogen phosphate and around 40 g/L of sodium salts of organic impurities. This solution flows continuously into a rotary biodegradation contactor containing the microorganism identified as ATCC 53883. The initial charge of microorganism is made as described in Example 2. The contactor provides a total residence time of about 3.5 hours, and operates at ambient temperature, ranging between 28° and 33° C. To provide an aerobic degradation, the contactor operates at 3 rpm.

Typically, the four compartment contactor operates in a series mode. It is appreciated that rotating biological contactors are widely used in the biodegradation field. The rotating biological contactor used in this embodiment operates under aerobic conditions and is readily available from companies such as Envirex, Waukesha, Wis. USA the unit has a capacity in the range of 1 tonne of sodium oxalate per day with a contactor surface area of 60,00 ft.$^2$. The pH of the solution in which the biodegradation occurs is typically 9.8, 9.7, 9.6 and 9.4, in respectively the first, second, third and fourth compartments. The contactor may also be operated with the compartments in parallel. There is no observable difference in the results obtained in either mode.

With these commercial flow rates providing a residence time in the range of 5 hrs, the liquid effluent leaving the contactor contains less than 25% by weight of the starting concentrations of oxalate, formate, acetate, and benzoate and other organic impurities. The effluent contains a small concentration of $NaHCO_3$ and $Na_2CO_3$. A more complete degradation of organic impurities may be obtained with longer residence times which can be achieved by slower flow rates or larger equipment volumes.

EXAMPLE 4

This test demonstrates that ATCC 53883 can degrade acetate, oxalate and benzoate.

Four solutions were made in 100 mL of the "inoculum" of pH 10.0 prepared according to Example 1. These solutions contained:

| | |
|---|---|
| Solution A | 3 g/L sodium acetate |
| Solution B | 3 g/L sodium benzoate |
| Solution C | 7 g/L sodium oxalate and |
| | 3 g/L sodium acetate |
| Solution D | 7 g/L sodium oxalate and |
| | 3 g/L sodium formate |

The solutions were adjusted to pH 10.0 by the addition of sodium hydroxide.

The solutions were held in 250 mL Erlenmeyer flasks. The flasks were placed in the orbital shaker, and agitated at 170 rpm, and held at 28°-30° C. over night (18 hours).

At the end of 18 hours, considerable biomass had built up in each flask. The liquid phase was decanted and analyzed by ion chromatography for acetate, oxalate and benzoate. No detectable concentrations of these species were found. The limit of detection of the analytical procedure was 0.05 g/L.

EXAMPLE 5

A base media containing:

| | |
|---|---|
| Ammonium monohydrogen phosphate | 0.5 g/L |
| Yeast extract | 0.1 g/L |
| Magnesium sulphate | 0.1 g/L |
| Ferrous sulphate | 0.05 g/L | was prepared. To the base media was added sodium acetate and pH adjusted to pH 11.

To 100 mL of this media, in a 250 mL Erlenmeyer flask, 5 mL of the inoculum, prepared as described previously, was added, and the contents shaken at 28°-30° C. The experiment was done in duplicate. For the blank determination, 5 mL of de-ionized water in place of the inoculum was added to the shake flasks. The procedure was repeated by adding sodium benzoate in place of the sodium acetate. The results are shown in Table I.

TABLE I

| Compound | Time hr | Initial Concentration g/L | Final Concentration | | |
|---|---|---|---|---|---|
| | | | Blank No Inoculum g/L | Results Flask 1 g/L | Flask 2 g/L |
| Sodium Benzoate | 17 | 2.38 | 2.08 | Not Detected | |
| | 24 | 4.76 | 4.57 | 1.35 | 3.12 |
| Sodium Acetate | 24 | 5.57 | 3.95 | 1.99 | 0.85 |

These results show that sodium benzoate and sodium acetate are more than one half degraded within normally 24 hrs.

EXAMPLE 6

Two (2) g/L solutions of sodium formate, sodium acetate and sodium benzoate and sodium tartrate were made and nutrients were added (0.19 yeast extract, 0.1 g magnesium sulphate, 0.05 g ferrous sulphate and 0.5 g ammonium phosphate). To these mixtures 28 g of Bacto Agar was added, dissolved and placed in the autoclave and sterilized for 15 minutes. The pH of the media was adjusted to 11.0 with 1N NaOH at a temperature of 60° C. These were then poured into presterilized petri dishes and allowed to solidify at room temperature.

With the aid of sterilized inoculating loop two plates each of:
 Na Formate Agar
 Na Acetate Agar
 Na Tartrate Agar
 Na Benzoate Agar
were inoculated with bacteria from the 250 mL shake flasks and placed in the incubator for 24 hrs at 37° C.

Growth bacteria was detected on all four types of Agar. The tartrate agar and acetate agar plates gave the most pronounced growth. Such growth demonstrates that the bacteria are capable of degrading these additional constituents.

The products from the improved process of this invention are simply biomass in a dilute solution containing sodium salts of carbonate and bicarbonates. The apparatus may be very simple in which the process is carried out. The particularly preferred form of the bioreactor, is a rotating biological contactor operating under aerobic conditions. The process may carried out at ambient temperature under very mild conditions which results in lower operating costs and low maintenance cost. The sodium values in the effluent from the rotating biological contactor can be recovered by recycling the effluent to the mud washing circuit of the Bayer process thereby reducing the amount of caustic make up cost that has to be introduced to the Bayer process. Furthermore, the nutrients as required in the prior form of biodegradation of oxalates which require various metals and other salts are no longer required in the system of this invention.

Although preferred embodiments of the invention have been described herein in detail, it will be understood by those skilled in the art that variations may be made thereto without departing from the spirit of the invention or the scope of the appended claims.

We claim:

1. In a process for biodegrading under highly alkaline conditions organics in a waste stream derived from a Bayer processing system for producing aluminum oxides,
 i) said waste stream being typical of oxalate waste streams resulting from alkaline treatment of bauxite, said oxalate waste streams being rich in oxalates, formates, acetates, benzoates and sodium ions and having a pH in excess of 8,
 ii) treating said highly alkaline waste stream to neutralize and thereby lower pH and to reduce sodium ion concentration prior to introducing said waste stream into a bioreactor,
 iii) biodegrading said oxalates in said bioreactor by use of Pseudomonas genus microorganisms, and
 iv) discharging at least a portion of the biodegraded waste stream, the improvement being characterized by:
  a) introducing said highly alkaline waste stream rich in sodium ions to said bioreactor to avoid said treatment of step ii),
  b) biodegrading said organics in said waste stream with said Pseudomonas genus microorganisms having the characteristics of ATCC 53883 and its derivatives which are functionally biologically equivalent to ATCC 53883, and
  c) wherein said biodegradation of organics, degrades in addition to oxalates in said waste stream, said formates, said acetates and said benzoates to yield said biodegraded waste stream.

2. In a process of claim 1, said step v) being further characterized by said waste stream having a pH in the range of 8 to 12.

3. In a process of claim 1, said biodegraded waste stream comprising sodium salts of carbonates and bicarbonates.

4. In a process of claim 3, said biodegraded waste stream being recycled in said Bayer process.

5. In a process of claim 1, said waste stream comprising about 4 g/L of sodium salts of organic impurities.

6. In a process of claim 5, said pH of said waste stream being in the range of 11 to 12.

7. In a process of claim 1, waste stream having a residue time in said bioreactor in the range of 3 to 5 hours.

8. In a process of claim 7, said biodegradation of said waste stream being carried out in a continuous flow multi-compartment rotary biocontactor operating at a temperature in the range of 25° C. to 35° C. and under aerobic conditions.

9. In a process of claim 8, said rotating biological contactor operating at a pH of approximately 9 in each compartment.

10. In a process of claim 3, said carbonates and bicarbonates buffer pH of media in said bioreactor to protect said microorganisms from momentary swings in pH of said waste stream due to temporary high acid content.

11. In a process of claim 1, said improvement being further characterized by addition of only sources of phosphorus and nitrogen to said biocontactor as nutrients for said microorganisms.

* * * * *